United States Patent
Sarfert et al.

(10) Patent No.: US 11,721,849 B2
(45) Date of Patent: Aug. 8, 2023

(54) METHOD FOR DIAGNOSIS OF A TEMPERATURE CONTROL MEANS OF A BATTERY PACK

(71) Applicant: Robert Bosch GmbH, Stuttgart (DE)

(72) Inventors: Christel Sarfert, Korntal-Muenchingen (DE); Jens Becker, Benningen Am Neckar (DE); Shweta Vijay Pawar, Kolhapur (IN); Triantafyllos Zafiridis, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 17/120,608

(22) Filed: Dec. 14, 2020

(65) Prior Publication Data
US 2021/0184282 A1 Jun. 17, 2021

(30) Foreign Application Priority Data
Dec. 13, 2019 (DE) .......................... 102019219629.2

(51) Int. Cl.
*H01M 50/20* (2021.01)
*H01M 10/48* (2006.01)
(Continued)

(52) U.S. Cl.
CPC ....... *H01M 10/486* (2013.01); *H01M 10/425* (2013.01); *H01M 10/625* (2015.04);
(Continued)

(58) Field of Classification Search
CPC ............. H01M 10/486; H01M 10/625; H01M 10/6572; H01M 50/20; H01M 10/425; H01M 2010/4271; H01M 2220/20
See application file for complete search history.

(56) References Cited

U.S. PATENT DOCUMENTS 11,283,115 B2 * 3/2022 Koerner .............. H01M 10/613
2007/0184337 A1 * 8/2007 Nagayama ............ H01M 50/24
429/82
(Continued)

FOREIGN PATENT DOCUMENTS

DE 102014224347 * 6/2016
DE 102014224347 A1 6/2016
(Continued)

OTHER PUBLICATIONS

DE 102018206487MT (Year: 2019).*
(Continued)

*Primary Examiner* — Alexander Usyatinsky
(74) *Attorney, Agent, or Firm* — Michael Best & Friedrich LLP

(57) ABSTRACT

A method for diagnosis of a temperature control means (30) of a battery pack (10) that comprises a plurality of battery cells (20) and a plurality of temperature sensors for measuring temperatures of the individual battery cells (20), the battery cells (20) being arranged side by side in the battery pack (10), in a longitudinal direction (12) of the battery pack (10), and mechanically connected to each another, and the battery cells (20) being arranged on the temperature control means (30) and mechanically and thermally connected to it. A battery management system, and/or a battery pack (10) may be configured to execute the method. A vehicle may be fitted with a battery pack that carries out the method.

10 Claims, 1 Drawing Sheet

(51) Int. Cl.
*H01M 10/625* (2014.01)
*H01M 10/6572* (2014.01)
*H01M 10/42* (2006.01)

(52) U.S. Cl.
CPC ....... *H01M 10/6572* (2015.04); *H01M 50/20* (2021.01); *H01M 2010/4271* (2013.01); *H01M 2220/20* (2013.01)

(56) References Cited

U.S. PATENT DOCUMENTS

| | | | | |
|---|---|---|---|---|
| 2010/0075206 A1* | 3/2010 | Tamura | ............ | H01M 10/6563 429/62 |
| 2011/0206967 A1* | 8/2011 | Itsuki | ............... | H01M 10/6556 429/120 |
| 2011/0256431 A1* | 10/2011 | TenHouten | ....... | H01M 10/6566 429/50 |
| 2013/0183555 A1* | 7/2013 | Boddakayala | ...... | H01M 10/647 29/890.03 |
| 2015/0010789 A1* | 1/2015 | Yagi | ..................... | H01M 10/63 429/50 |
| 2017/0040653 A1* | 2/2017 | Morris | ............... | H01M 10/647 |
| 2017/0253142 A1* | 9/2017 | Buckhout | ........... | H01M 10/486 |
| 2017/0284709 A1* | 10/2017 | Hirsch | ................ | H01M 10/486 |
| 2017/0346139 A1* | 11/2017 | Kobayashi | .......... | H01M 50/278 |
| 2017/0358933 A1* | 12/2017 | Becker | ................ | H01M 10/633 |
| 2021/0242512 A1* | 8/2021 | Koerner | ............. | H01M 10/486 |

FOREIGN PATENT DOCUMENTS

| | | | |
|---|---|---|---|
| DE | 102017128314 | * | 5/2019 |
| DE | 102017128314 | A1 | 5/2019 |
| DE | 102018108003 | * | 10/2019 |
| DE | 102018108003 | A1 | 10/2019 |
| DE | 102018206487 | * | 10/2019 |
| DE | 102018206487 | A1 | 10/2019 |

OTHER PUBLICATIONS

DE102018108003MT (Year: 2019).*
DE102017128314MT (Year: 2019).*
DE102014224347MT (Year: 2016).*
Wikipedia, "Battery Management System," <https://en.wikipedia.org/wiki/Battery_management_system> web page dated Aug. 23, 2022 (6 pages).

* cited by examiner

METHOD FOR DIAGNOSIS OF A TEMPERATURE CONTROL MEANS OF A BATTERY PACK

BACKGROUND OF THE INVENTION

The invention relates to a method for diagnosis of a temperature control means of a battery pack that comprises a plurality of battery cells and a plurality of temperature sensors for measuring temperatures of the individual battery cells, the battery cells being arranged side by side in the battery pack, in a longitudinal direction of the battery pack, and mechanically connected to each another, and the battery cells being arranged on the temperature control means and mechanically and thermally connected to it.

The invention additionally relates to a battery management system that is configured to execute the method according to the invention.

The invention also relates to a battery pack that is configured to execute the method according to the invention, and/or that comprises a battery management system according to the invention.

The invention furthermore relates to a vehicle that comprises at least one battery pack according to the invention.

It is becoming apparent that the use of electrically driven motor vehicles will increase in the future. Rechargeable batteries are used in such electric vehicles, mainly to supply electric drive systems with electrical energy. Lithium-ion battery cells, in particular, are suitable for such applications. Lithium-ion battery cells are characterized by, inter alia, high energy densities, thermal stability and extremely low self-discharge. Lithium-ion battery cells have stringent requirements in respect of functional safety. Improper operation of lithium-ion battery cells can lead to exothermic reactions, including fire and/or release of gas.

A battery pack comprises a plurality of such lithium-ion battery cells, which can be electrically connected to each other in series or in parallel. Such a battery pack additionally comprises a management system that monitors the operation of the battery cells and controls it in such a manner that the battery cells are operated safely and sustainably in respect of their service life.

To enable the battery cells of a battery pack to be operated sustainably, it is necessary to determine current state variables of the individual battery cells. These state variables comprise various parameters such as, for example, a state of charge, a state of ageing, an internal resistance, a capacity, a temperature and a voltage.

SUMMARY OF THE INVENTION

A method is proposed for diagnosis of temperature control means of a battery pack.

The battery pack in this case comprises a plurality of battery cells, which are arranged side by side in the battery pack, in a longitudinal direction of the battery pack, and mechanically connected to each other. The battery cells are arranged on the temperature control means and are mechanically and thermally connected to it.

The battery pack additionally comprises a plurality of temperature sensors for measuring temperatures of the individual battery cells.

The battery cells are preferably each realized as a lithium-ion battery cell. The battery cells are each preferably prismatic.

In the sequence of the method according to the invention, a reference temperature distribution of the battery pack in the longitudinal direction of the battery pack is first determined. The reference temperature distribution in this case depends on the structure of the battery pack. The reference temperature distribution that is to be expected over the entire service life may be determined, for example, by means of experiments on the battery pack or on the vehicle. It is assumed in this case that the boundary conditions such as, for example, installation and structure of the battery pack, do not change. This temperature distribution over the cells remains constant over the entire service life. For example, a temperature gradient between cells having a highest and lowest temperature is greatest when the battery pack is subjected to high stress. If the battery pack is thermally relaxed, then a temperature gradient is zero. It is assumed that the temperature gradient is in principle always constant, with only an amplitude of the temperature difference changing during operation of the battery pack.

The reference temperature distribution in this case may have such a distribution pattern in the longitudinal direction of the battery pack that, when the temperature control means is switched on, the temperature in the battery pack drops from a central region of the battery pack to the respective peripheral regions of the battery pack. In other words, the temperature in the battery pack is from a central region of the battery pack in dependence on a distance between the central region of the battery pack and a position of the individual battery cells. The greater the distance becomes, the lower the temperatures of the individual battery cells becomes. A structure of the battery pack may be used to set this distribution pattern. The temperature gradient between a maximum and minimum cell temperature, i.e. between the central region and the peripheral region of the battery pack, may be minimized, for example, by more intensive cooling in the center of the battery pack.

The temperatures of the individual battery cells are then measured during operation of the battery pack when the temperature control means is switched on. An actual temperature distribution of the battery pack, in the longitudinal direction of the battery pack, is formed in this case, on the basis of the measured temperatures of the individual battery cells.

After that, the actual temperature distribution is compared with the reference temperature distribution. A profile of a difference between the actual and the reference temperature distribution is formed.

An ineffective temperature control state of the temperature control means is then identified if the difference between the actual and the reference temperature distribution exceeds a predefined threshold value. Preferably, the predefined threshold value may be set. The ineffective temperature control state may be caused in this case by ageing of the connection between the battery cells and the temperature control means, high temperatures of the battery cells, an accident or a material defect. The threshold value may be determined, for example, by means of tests in a laboratory or vehicle. Battery packs that are functional, or that have a defect, may be analyzed for this purpose. The functional battery packs may be used to ascertain a normal temperature spread. The defective battery pack may be used to determine the deviation from normal behavior. If a battery cell becomes detached from the cooling system, this battery cell may heat up by, for example, 10° C. more than previously.

Preferably, one or more battery cells that are temperature-controlled in an ineffective manner by the temperature control means are identified. The battery cells that are temperature-controlled in an ineffective manner by the temperature control means have a higher than expected temperature. These battery cells are identified on the basis of the profile of the difference between the actual and the reference temperature distribution.

Preferably, the method according to the invention is executed by means of a battery management system for monitoring and controlling the battery pack. It is also conceivable for the method according to the invention to be executed by another control device such as, for example, a vehicle control device (VCU: vehicle control unit).

Preferably, following the identification of an ineffective temperature control state of the temperature control means, and/or following the identification of one or more battery cells that are temperature-controlled in an ineffective manner by the temperature control means, a service procedure is initiated in order to investigate or check, for example, whether connection points between the respective battery cells and the temperature control means are defective, or whether the temperature control means is defective.

Preferably, the reference temperature distribution in the longitudinal direction of the battery pack is set by setting a temperature control performance of the temperature control means and/or through design of a structure of the temperature control means. The temperature control performance of the temperature control means may be set, for example, by changing a flow rate of a temperature control medium. The structure of the temperature control means may be designed, for example, in such a manner that a greater quantity of the temperature control medium flows through in a central region of the temperature control means than in the respective peripheral regions of the temperature control means. In this way, a uniform distribution pattern of the reference temperature distribution is achieved.

Preferably, the battery cells are mechanically and thermally connected to the temperature control means in a materially bonded manner. The battery cells in this case may be mechanically and thermally connected to the temperature control means by welding, soldering or adhesive bonding.

Preferably, the battery cells are each monitored by specifically one temperature sensor. Advantageously, the position of the ineffectively temperature-controlled battery cell can be identified with precision. If a plurality of battery cells is temperature-controlled in an ineffective manner, the positions of the respective battery cells can be identified. However, it is also possible to monitor two battery cells together by means of one temperature sensor.

Advantageously, the temperature control means has a channel-type structure, which serves to convey a temperature control medium such as, for example, water.

The temperature control means is realized, advantageously, as a Peltier element. A Peltier element is an electrothermal transducer that, based on the Peltier effect, generates a current flow when there is a current flow through a temperature difference or when a temperature difference occurs. Peltier elements may be used both for cooling and—when the current direction is reversed—for heating.

Additionally, proposed is a battery management system, which is configured to execute the method according to the invention.

Also proposed is a battery pack, which is configured to execute the method according to the invention, and/or which comprises a battery management system according to the invention.

Furthermore, proposed is a vehicle, which comprises at least one battery pack according to the invention.

Advantages of the Invention

The method according to the invention enables an ineffective temperature control state of a temperature control means of a battery pack to be determined in a relatively simple and precise manner. The method according to the invention makes it possible to identify a position at which a thermal connection between a battery cell and the temperature control means is impaired. If the thermal connections are impaired at a plurality of positions, the plurality of positions can also be identified by means of the method according to the invention. With the method according to the invention, it is advantageously possible, following the identification of an ineffective temperature control state of the temperature control means, and/or following the identification of one or more battery cells that are temperature-controlled in an ineffective manner by the temperature control means, to initiate a service procedure in order to investigate or check, for example, whether connection points between the respective battery cells and the temperature control means are defective, or whether the temperature control means is defective.

BRIEF DESCRIPTION OF THE DRAWINGS

Embodiments of the invention are explained in greater detail on the basis of the drawings and the following description.

DETAILED DESCRIPTION

In the following description of the embodiments of the invention, elements that are the same or similar are denoted by the same references, and in individual cases description of these elements is not repeated. The subject-matter of the invention is represented only schematically in the figures.

Figure 1:
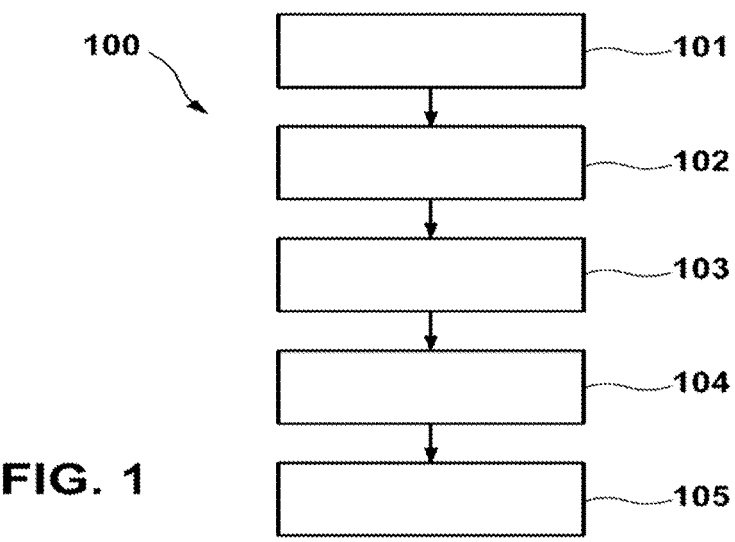
FIG. 1 shows a flow diagram of the method according to the invention.

FIG. 1 shows a flow diagram 100 of the method according to the invention for diagnosis of a temperature control means 30 (see FIG. 2) of a battery pack 10 (see FIG. 2), which a plurality of battery cells 20 (see FIG. 2) and a plurality of temperature sensors for measuring the temperatures of the individual battery cells 20.

In a first step 101, firstly, a reference temperature distribution of the battery pack 10 in a longitudinal direction 12 (see FIG. 2) of the battery pack 10 is determined.

Then, in a second step 102, the temperatures of the individual battery cells 20 during operation of the battery pack 10 are measured, when the temperature control means 30 is switched on. An actual temperature distribution of the battery pack 10 in the longitudinal direction 12 of the battery pack 10 is formed, based on the measured temperatures of the individual battery cells 20.

After that, in a step 103, the actual temperature distribution is compared with the reference temperature distribution. In this case a profile of a difference between the actual and the reference temperature distribution is formed.

Then, in a step 104, an ineffective temperature control state of the temperature control means 30 is identified if the difference between the actual and the reference temperature distribution exceeds a predefined threshold value. Preferably, the predefined threshold value may be set.

After that, in a step 105, there is identification one or more battery cells 20 that are temperature-controlled in an ineffective manner by the temperature control means 30. The battery cells 20 that are temperature-controlled in an ineffective manner by the temperature control means 30 have a higher than expected temperature. These battery cells 20 are identified by the profile of the difference between the actual and the reference temperature distribution.

Preferably, the method according to the invention is executed by means of a battery management system for monitoring and controlling the battery pack 10. It is also conceivable for the method according to the invention to be executed by another control unit such as, for example, a vehicle control device (VCU: vehicle control unit).

Preferably, following the identification of an ineffective temperature control state of the temperature control means 30, and/or following the identification of one or more battery cells 20 that are temperature-controlled in an ineffective manner by the temperature control means 30, a service procedure is initiated in order to investigate or check, for example, whether connection points between the respective battery cells 20 and the temperature control means 30 is defective, or whether the temperature control means 30 is defective.

Figure 2:
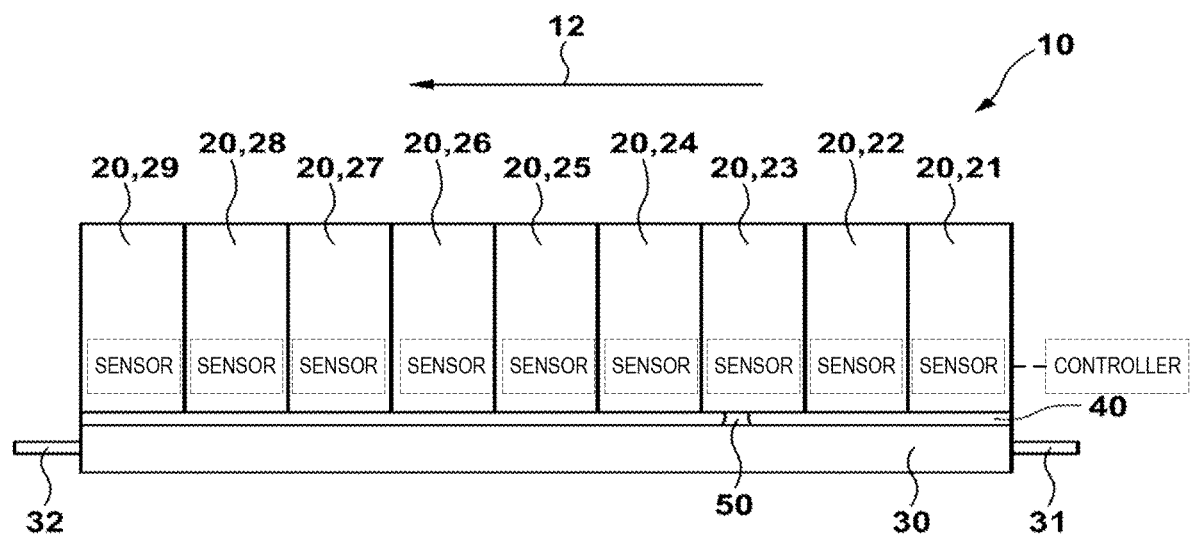
FIG. 2 shows a schematic diagram of a battery pack.

A battery pack 10 is represented schematically in FIG. 2.

The battery pack 10 in this case comprises a plurality of battery cells 20. FIG. 2 shows nine battery cells 20, namely, as viewed from the right, a first battery cell 21 to a ninth battery cell 29. The battery cells 20, 21 to 29 are in this case arranged side by side in the battery pack 10, in a longitudinal direction 12 of battery pack 10, and are mechanically connected to each other. The battery cells 20, 21 to 29 are arranged on a temperature control means 30, and are mechanically and thermally connected to it by an adhesive layer 40.

The battery cells 20, 21 to 29 in this case may also be mechanically and thermally connected to the temperature control means 30 by welding or soldering.

The battery cells 20, 21 to 29 are each realized as a lithium-ion battery cell and are prismatic.

The temperature control means 30 has a channel-type structure (not represented), which serves to convey a temperature control medium such as, for example, water. The temperature control means 30 in this case has a supply connection 31 for supplying the temperature control medium, and has a discharge connection 32 for discharging the temperature control medium.

It is also conceivable for the temperature control means 30 to be realized as a Peltier element.

For the battery pack 10 represented in FIG. 2, a reference temperature distribution is determined, which has such a distribution pattern that the temperature in the battery pack 10 drops from a central region of the battery pack 10 to respective peripheral regions 14 of the battery pack 10 when the temperature control means 30 is switched on. In the present embodiment, the fifth battery cell 25, which is arranged in a central region of the battery pack 10, has a highest temperature in the battery pack 10.

The battery pack 10 additionally comprises a plurality of temperature sensors (not represented) for measuring the temperatures of the individual battery cells 20, 21 to 29. Preferably, the battery cells 20, 21 to 29 are each monitored by specifically one temperature sensor.

During operation of battery pack 10, the temperatures of the individual battery cells 20, 21 to 29 are measured when the temperature control means 30 is switched on. Based on the measured temperatures of the individual battery cells 20, 21 to 29, an actual temperature distribution of battery pack 10 in the longitudinal direction 12 of battery pack 10 is formed.

A profile of a difference between the actual and the reference temperature distribution is then formed by comparison of the actual the and reference temperature distribution.

It can be seen from FIG. 2 that the adhesive layer 40 has a defect 50 in an region between the third battery cell 23 and the temperature control means 30, which results in an impairment of a thermal connection between the third battery cell 23 and the temperature control means 30. The defect 50 may in this case be caused by ageing of the adhesive layer 40, high temperatures of the battery cells 20, 21 to 29, an accident or a material defect. In this case, less heat is transferred from the third battery cell 23 to the temperature control means 30, or from the temperature control means 30 to the third battery cell 23, and the third battery cell 23 has a higher than expected temperature.

A difference between the measured temperature of the third battery cell 23 and a temperature resulting from the reference temperature distribution of the battery pack 10 is represented by means of the profile of the difference between the actual and the reference temperature distribution.

If the difference between the measured temperature of the third battery cell 23 and a temperature resulting from the reference temperature distribution of the battery pack 10 exceeds a given threshold value, an ineffective temperature control state of temperature control means 30 is identified.

If the battery cells 20, 21 to 29 are each monitored by specifically one temperature sensor, a position at which the thermal connection between the third battery cell 23 and the temperature control means 30 is impaired can be identified.

The invention is not limited to the design exemplary embodiments described here and to the aspects highlighted therein. Rather, within the range indicated by the claims, a large number of variations are possible, which are within the scope of professional practice.

The invention claimed is:

1. A method for diagnosis of a temperature control means (30) of a battery pack (10) that comprises a plurality of battery cells (20) and a plurality of temperature sensors for measuring temperatures of the individual battery cells (20), the battery cells (20) being arranged side by side in the battery pack (10), in a longitudinal direction (12) of the battery pack (10), and connected to each other, the battery cells (20) being arranged on the temperature control means (30) and connected to the temperature control means (30), wherein the connection includes a thermal connection, the method comprising the following steps:
    determining a reference temperature distribution of the battery pack (10) in the longitudinal direction (12) of the battery pack (10);
    measuring the temperatures of the individual battery cells (20) during operation of the battery pack (10) when the temperature control means (30) is switched on, and forming an actual temperature distribution of the battery pack (10), in the longitudinal direction (12) of the battery pack (10), on the basis of the measured temperatures of the individual battery cells (20);
    comparing the actual temperature distribution with the reference temperature distribution and forming a profile of a difference between the actual and the reference temperature distribution; and
    identifying an ineffective temperature control state of the temperature control means (30) based on the difference between the actual and the reference temperature distribution exceeding a predefined threshold value.

2. The method according to claim 1, further comprising: identifying one or more battery cells (20) that are temperature-controlled in an ineffective manner by the temperature control means (30), on the basis of the profile of the difference between the actual and the reference temperature distribution.

3. The method according to claim 1, wherein the reference temperature distribution is set by setting a temperature control performance of the temperature control means (30) and/or through design of a structure of the temperature control means (30).

4. The method according to claim 1, wherein the battery cells (20) are mechanically and thermally connected to the temperature control means (30) in a materially bonded manner.

5. The method according to claim 1, wherein the battery cells (20) are each monitored by specifically one temperature sensor.

6. The method according to claim 1, wherein the temperature control means (30) has a channel-type structure for conveying a temperature control medium.

7. The method according to claim 1, wherein the temperature control means (30) is realized as a Peltier element.

8. A battery management system for diagnosis of a temperature control means (30), the batter management system comprising:
 a battery pack (10) having a plurality of battery cells (20) and a plurality of temperature sensors for measuring temperatures of the individual battery cells (20),
 the battery cells (20) being arranged side by side in the battery pack (10), in a longitudinal direction (12) of the battery pack (10), and connected to each other, the battery cells (20) being arranged on the temperature control means (30) and connected to the temperature control means (30), wherein the connection includes a thermal connection,
 the battery management system including an electronic controller programmed to
  determine a reference temperature distribution of the battery pack (10) in the longitudinal direction (12) of the battery pack (10);
  measure the temperatures of the individual battery cells (20) during operation of the battery pack (10) when the temperature control means (30) is switched on, and forming an actual temperature distribution of the battery pack (10), in the longitudinal direction (12) of the battery pack (10), on the basis of the measured temperatures of the individual battery cells (20);
  compare the actual temperature distribution with the reference temperature distribution and forming a profile of a difference between the actual and the reference temperature distribution; and
  identify an ineffective temperature control state of the temperature control means (30) based on the difference between the actual and the reference temperature distribution exceeding a predefined threshold value.

9. A battery pack (10) for diagnosis of a temperature control means (30), comprising:
 a plurality of battery cells (20), the battery cells (20) being arranged side by side in the battery pack (10), in a longitudinal direction (12) of the battery pack (10), and connected to each other,
 a plurality of temperature sensors for measuring temperatures of the individual battery cells (20),
 the temperature control means (30 connected to the battery cells (20) arranged on the temperature control means (30), wherein the connection includes a thermal connection, and
 a battery management system that includes an electronic controller,
 the battery pack (10) configured to
  determine, with the electronic controller, a reference temperature distribution of the battery pack (10) in the longitudinal direction (12) of the battery pack (10);
  measure, with the electronic controller, the temperatures of the individual battery cells (20) during operation of the battery pack (10) when the temperature control means (30) is switched on, and forming an actual temperature distribution of the battery pack (10), in the longitudinal direction (12) of the battery pack (10), on the basis of the measured temperatures of the individual battery cells (20);
  compare, with the electronic controller, the actual temperature distribution with the reference temperature distribution and forming a profile of a difference between the actual and the reference temperature distribution; and
  identify, with the electronic controller, an ineffective temperature control state of the temperature control means (30) based on the difference between the actual and the reference temperature distribution exceeding a predefined threshold value.

10. A vehicle, which comprises at least one battery pack (10) according to claim 9.

* * * * *